No. 826,810. PATENTED JULY 24, 1906.
H. J. UDHAUG.
MEANS FOR CONTROLLING AND DRIVING HORSES WITHOUT BITS.
APPLICATION FILED MAR. 5, 1904. RENEWED JUNE 25, 1906.
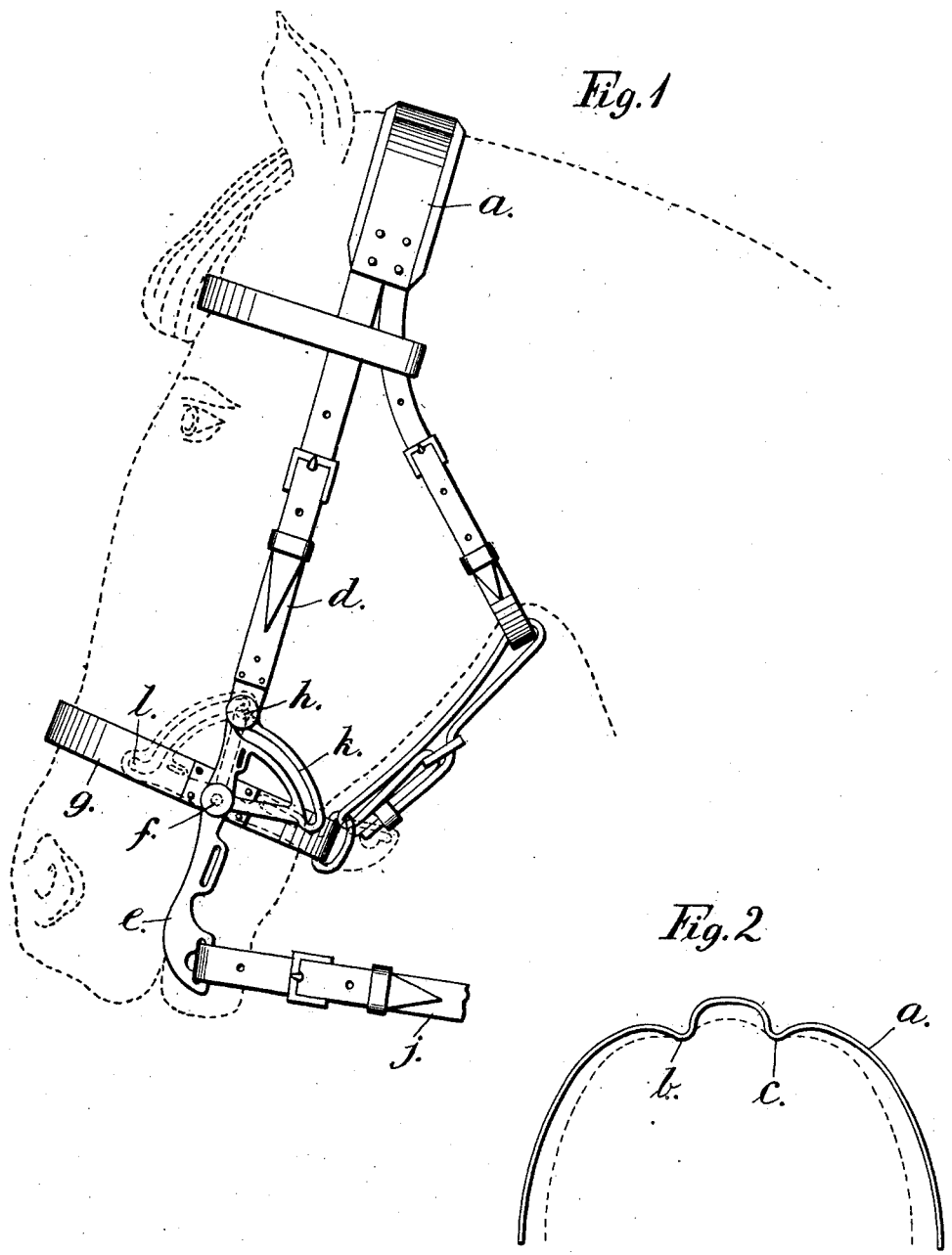
Witnesses.
Inventor
Hans Jörgen Udhaug
by B. Singer atty.
THE NORRIS PETERS CO., WASHINGTON, D. C.

UNITED STATES PATENT OFFICE.

HANS JÖRGEN UDHAUG, OF BODÖ, NORWAY.

MEANS FOR CONTROLLING AND DRIVING HORSES WITHOUT BITS.

No. 826,810.      Specification of Letters Patent.      Patented July 24, 1906.

Application filed March 5, 1904. Renewed June 25, 1906. Serial No. 323,342.

*To all whom it may concern:*

Be it known that I, HANS JÖRGEN UDHAUG, a subject of the King of Norway, and a resident of the town of Bodö, Norway, have invented certain new and useful Improvements in Means for Controlling and Driving Horses Without Bits, (for which I have obtained patents in Norway, No. 12,249, bearing date March 16, 1903, and No. 12,264, bearing date April 27, 1903, addition to Patent No. 12,249,) of which the following is a specification.

My invention relates to improvements in that class of bridles which have no bit; and the main feature of my said invention is the construction of a neck-strap of stiff material and given such a shape that it rests on the neck of the horse only in two points, one on each side of the neck, said neck-strap being connected to the upper ends of the ordinary cheek-straps, the lower ends of which are, by means of a pin, combined with one end of a pair of levers which are pivotally mounted on the nose-strap of the bridle, while the reins are attached to the opposite ends of the said levers, the object being to produce a slight pressure on the neck of the animal when pulling one or both reins. Further, the said levers are provided with an arch having a slot which engages the pin on the cheek-straps, the object being to be able to turn the levers aside, so as to be out of way when the animal is feeding, and by making the said slot eccentric to the fulcrum of the lever in turning the lever aside the nose-strap will be lowered, so as to allow the jaws to be opened when feeding.

The invention is explained by the accompanying drawings, in which—

Figure 1 is a side view of a bridle construced according to my invention, and Fig. 2 is an enlarged view of the neck-strap.

Referring to the drawings, $a$ is the neck-strap, which is made of stiff material and provided with two recesses $b$ and $c$, forming supports which rest one on each side of the neck of the animal. The neck-strap is secured to the upper ends of the ordinary cheek-straps $d$.

$e$ is a lever which at $f$ is pivotally mounted on the nose-strap $g$. One end of the said lever is engaged with a pin $h$ on the lower end of the cheek-strap $d$, and to the opposite end of the lever is attached the rein $j$.

The operation of this new bridle is that in pulling one or both reins the lever will turn on its pivot, thereby tightening one or both cheek-straps, and consequently producing a pressure of the neck-strap on the neck of the animal. In order to be able to turn the lever aside, (see dotted position in Fig. 1,) the lever is provided with an arch $k$, which has a slot for engaging the pin $h$, the said slot at the point which is normally engaged with the pin $h$ being provided with a recess $l$ for the reception of the pin in order to prevent the turning aside of the lever when driving. By making that end of the slot which engages the pin $h$ when the lever is turned aside farther away from the pivot $f$ than the recess $l$ in turning the lever the nose-strap will be lowered, thereby allowing the horse to open the jaws when feeding. The nose-strap should preferably be made stiff, so as to prevent its turning around the nose of the animal when pulling one rein.

Having now described my invention, what I claim as new, and desire to secure by Letters Patent, is—

1. The improved means for controlling and driving horses consisting in the combination of a neck-strap of stiff material and formed so as to rest against the animal's neck in two points, one on each side of the neck, and a pair of levers fulcrumed on the nose-strap having one end connected to the ordinary cheek-straps and the other end attached to the reins, substantially as and for the purpose hereinbefore described.

2. The improved means for controlling and driving horses consisting in the combination of a neck-strap of stiff material and formed so as to rest against the animal's neck in two points, one on each side of the neck, and a pair of levers fulcrumed on the nose-strap having one end connected to the ordinary cheek-straps and the other end attached to the reins, and means for allowing said levers to be turned aside substantially as shown and for the purpose described.

In testimony whereof I affix my signature in presence of two witnesses.

HANS JÖRGEN UDHAUG.

Witnesses:
  N. G. FAUDBERG,
  KR. Y. RÖILERGÖRD.